United States Patent [19]

O'Carroll et al.

[11] Patent Number: 5,569,385
[45] Date of Patent: Oct. 29, 1996

[54] FOOD PROCESSING EFFLUENT RENDERING PROCESS AND APPARATUS

[75] Inventors: Lynda C. O'Carroll; Colm D. O'Carroll; Alan Jones, all of Edmonton; Marilyn T. Matlock, Winterburn; Roderick D. McLeod, Edmonton, all of Canada

[73] Assignee: Epsilon Chemicals Ltd., Edmonton, Canada

[21] Appl. No.: 340,331

[22] Filed: Nov. 14, 1994

[51] Int. Cl.⁶ .................................................. C02F 1/54
[52] U.S. Cl. ........................ 210/727; 210/728; 210/730
[58] Field of Search ................................ 210/726, 727, 210/728, 729, 730, 731

[56] References Cited

U.S. PATENT DOCUMENTS

| | | | |
|---|---|---|---|
| 2,393,269 | 1/1946 | Rudolfs | 252/181 |
| 3,276,998 | 10/1966 | Green | 210/52 |
| 3,300,406 | 1/1967 | Pollio | 210/52 |
| 3,338,828 | 8/1967 | Clark | 210/52 |
| 3,342,732 | 9/1967 | Goetz | 210/54 |
| 3,350,304 | 10/1967 | Bacon | 210/52 |
| 3,406,114 | 10/1968 | Goren | 210/54 |
| 3,622,510 | 10/1968 | Fellcetta et al. | 210/52 |
| 3,627,680 | 10/1968 | Desbos | 210/52 |
| 3,657,182 | 4/1972 | Jolly | 260/33.4 |

(List continued on next page.)

FOREIGN PATENT DOCUMENTS

| | | |
|---|---|---|
| 2009943 | of 1990 | Canada . |
| 49-79374 | of 1974 | Japan . |
| 52-143982 | of 1977 | Japan . |
| 57-132508 | of 1982 | Japan . |
| 57-207589 | of 1982 | Japan . |
| 61-188000 | of 1985 | Japan . |
| 1-288393 | of 1989 | Japan . |

OTHER PUBLICATIONS

Meat, fish, and poultry processing wastes, William T. McComis, John H. Litchfield, Industrial Wastes, Journal WPCF, vol. 60, No. 6. pp. 868–870.

Study on Treatment of Waste Water from Fish Processing Factories with Flocculants II, Flocculant Effects of Marine Algae, by Makoto Takei from Bull, Tokai Reg. Fish. Res. Lab. (89). 65–74 (1977) Translation from Japanese.

Litex A/S Application Bulletin, 6 pages.

Marine Colloids Division, FMC Corporation, Carrageenan, 39 pages, Copyright 1977 by FMC Corporation.

(List continued on next page.)

*Primary Examiner*—Neil McCarthy
*Attorney, Agent, or Firm*—Anthony R. Lambert

[57] ABSTRACT

A process for the rendering of an effluent stream from a food processing plant, in which the effluent has or is made to have an acidic pH and carries proteinaceous material. The effluent is contacted with an inorganic coagulant (clay) that together with the acidic pH effectively neutralizes ionic charges on the proteinaceous material to cause the proteinaceous material to precipitate out of solution. The effluent stream is contacted with a biologically derived polymeric flocculant to facilitate settling of the precipitated proteinaceous material as flocs. The inorganic coagulant is present in an amount by weight of at least 1.5 times or 2.5 times the amount by weight of polymeric flocculant. Flocs are removed from the effluent stream to thereby render the effluent stream. A biologically derived co-flocculant is added to the effluent stream after contact with the effluent stream by coagulant and flocculant. Insoluble salts of alkaline earth metals are added to the effluent stream after contact with the effluent stream by coagulant and flocculant. The process may be applied to unit operations within the food processing plant. Apparatus for floc treatment include a mixing and acidity settling tank, a conical settling vessel with baffled outlet, a floc seed supply for effluent entering the settling vessel, an effluent diffuser at the inlet to the settling vessel and an agitator set to delay agitation until floc settles in the settling vessel.

15 Claims, 3 Drawing Sheets

U.S. PATENT DOCUMENTS

| | | | |
|---|---|---|---|
| 3,681,283 | 8/1972 | Yueh | 210/47 |
| 3,734,734 | 5/1973 | Halpern et al. | 99/48 |
| 3,763,039 | 10/1973 | Wilson | 210/6 |
| 3,842,003 | 10/1974 | Per Nettli | 210/43 |
| 3,859,210 | 1/1975 | Hatch | 210/28 |
| 3,958,364 | 5/1976 | Schenck et al. | 47/1.4 |
| 4,353,803 | 10/1982 | Dover, Jr. | 210/728 |
| 4,363,733 | 12/1982 | Meiller et al. | 210/727 |
| 4,425,238 | 1/1984 | Degen et al. | 210/666 |
| 4,456,532 | 6/1984 | Leslie et al. | 210/602 |
| 4,565,635 | 1/1986 | Le Du et al. | 210/727 |
| 4,693,842 | 9/1987 | Shilo et al. | 252/356 |
| 4,790,943 | 12/1988 | Dunn et al. | 210/705 |
| 4,966,713 | 10/1990 | Keys et al. | 210/705 |
| 5,174,903 | 12/1992 | Miller | 210/725 |
| 5,393,435 | 2/1995 | Deans et al. | 210/714 |
| 5,433,865 | 7/1995 | Laurent | 210/727 |

OTHER PUBLICATIONS

Water Gelling Applications of Carrageenan, 31 pages, Copyright 1981 by FMC Corporation.

Carrageenan Bibliography Applications and Technology, 31 pages, Copyright 1982 by FMC Corp.

Marine Colloids, The Carrageenan People, Introductory Bulleting A–1, 7 pages, by FMC Corporation.

Marine Colloids, The Carrageenan People, p. 22–36, Copyright 1988 FMC Corporation.

Chemical Abstracts, vol. 99, 1983. 110281, 1 page.

Translation of Japanese Patent Disclosure Number 49–42150, Apr. 20, 1974, Inventors: Kaoru Tamoto and Kaoru Iwamoto.

Translation of Japanese Patent Disclosure No. 51–103673, Sep. 13, 1976, Inventors: Katsumasa Tokunaga, Masayasu Takeuchi, Masamitsu Matsuzawa and Tomonori Nagahama.

Translation of Japanese Patent Disclosure No. 53–20654, Feb. 25, 1978, Inventors: Kikuo Nojiro, Kiyoshi Yoshizawa, Kazuhide Nishida, Kenkichi Kodama.

Translation of Japanese Patent Disclosure No. 1979 [Showa 54]–73,463, Method of Treating Waste Water Containing Starch. Inventors: S. Shinoda, T. Kanemori, T. Hisashita.

FOOD PROCESSING EFFLUENT RENDERING PROCESS AND APPARATUS

FIELD OF THE INVENTION

This invention relates to a method and apparatus for the rendering of effluent to produce animal feed.

BACKGROUND OF THE INVENTION

In the treatment of waste waters from food processing plants, several methods have been described for removal and reduction of the BOD (biological oxygen demand), oil and grease or total suspended solids. These typically use treatment of the waste water with a coagulant and flocculant at an acidic pH.

In U.S. Pat. No. 5,174,903, Miller describes the use of lignins such as alkali lignins, amine alkali lignins, sulphonated alkali lignins and sulphonic acid, ethoxylated sodium salt of alkali lignin as coagulants and variety A of biological polymers including carrageenan as flocculants. The combination of lignins and biological polymer gives rise to medium to large sized flocs depending on the ratio of lignin to polymer used. Reductions in the BOD and suspended solids are also obtained for the treated clear effluent. The addition of lignin derivatives as a coagulant effectively reduces the amount of biological flocculant required and produces a floc that is apparently more easily settled even though no measure of the settleability was reported.

In a related patent, U.S. Pat. No. 4,966,713, the use of a crude algal composition or an alkali extract of a crude algae composition in effluent treatment has been described. The preferred algae is one belonging to the class of Rhodophyceae or red algae which is the only source of carrageenan. The algal composition is used as both a coagulant and flocculant. Effective reduction of the COD (by 78%) and TSS (by 86%) is claimed for this treatment using a dissolved air flotation (DAF) unit.

Other applications using purified polymers from seaweeds have also been described e.g. FR 2371385 for the use of alginic acid and micro sand.

Due to the emphasis on biologically derived coagulants and flocculants, these prior art methods tend to be expensive. In addition, use of DAF separation appears to be disadvantageous when the effluent has a high fat content, such as in fish processing.

The design of an efficient and inexpensive waste water treatment process is complicated by environmental concerns, for example in the disposal of the components in the effluent. The difficulty is even greater when, as proposed by the inventors of this invention, the solids removed from the waste water are to be used as animal feed.

The difficulties are even greater when large volumes of waste water in the range 2-5 million gallons per day need to be treated. Such volumes require fast settling time. The settling time depends both on the coagulant-flocculant used and on the equipment used in the separation process. While several designs are known from the prior art, the inventors have proposed a novel method to provide rapid batch or continuous processing of large volumes of effluent from food processing plants.

SUMMARY OF THE INVENTION

In one aspect of the invention, there is proposed the use in the rendering of effluent, where the effluent is or is made acidic, an inorganic coagulant and a biologically derived polymeric flocculant, in which the inorganic coagulant is present in at least 1.5 times, and preferably more than 2.5 times, for example 5 times, the amount by weight of the flocculant. Clay as the inorganic coagulant and polymeric flocculants have been found effective in treating effluent from a red meat processing plant but are also effective in treating effluents from other plants (e.g. fish, chicken and turkey) and the unit stream from a reduction plant of a fish processing plant. The coagulant and flocculant are non-toxic and free of metal salts.

To facilitate the separation of the flocculated material from the liquid phase of the treated effluent, a further aspect of the invention provides an array of three settling chambers. The design of these identical chambers is such that it provides settling and compaction of sludges from a clear effluent stream with a residence time of 30–45 minutes in preferably, a semi-continuous mode of operation.

In a further aspect of the invention, there is provided apparatus for the rendering of effluent from a food processing plant. The apparatus includes a mixing tank having means to adjust the pH of fluid in the mixing tank, the mixing tank connected to receive effluent from the food processing plant; a settling vessel having an inlet connected to receive fluid from the mixing tank; and a source of inorganic coagulant and biologically derived flocculant connected to the mixing tank.

Preferably, a source of flocs is disposed to intercept fluid from the mixing tank as it enters the settling vessel. A diffusor on the inlet into the settling vessel also intercepts and slows down fluid entering the settling vessel. The settling vessel may form a cone with an outlet at the apex of the cone with a baffle to inhibit vortex formation above the outlet. Preferably an agitator in the settling vessel is set to delay agitation until after flocs begin to settle in the settling vessel.

BRIEF DESCRIPTION OF THE DRAWINGS

There will now be described a preferred embodiment of the invention, with reference to the drawings, by way of illustration, in which like numerals denote like elements and in which.

DETAILED DESCRIPTION OF PREFERRED EMBODIMENTS

Figure 1:
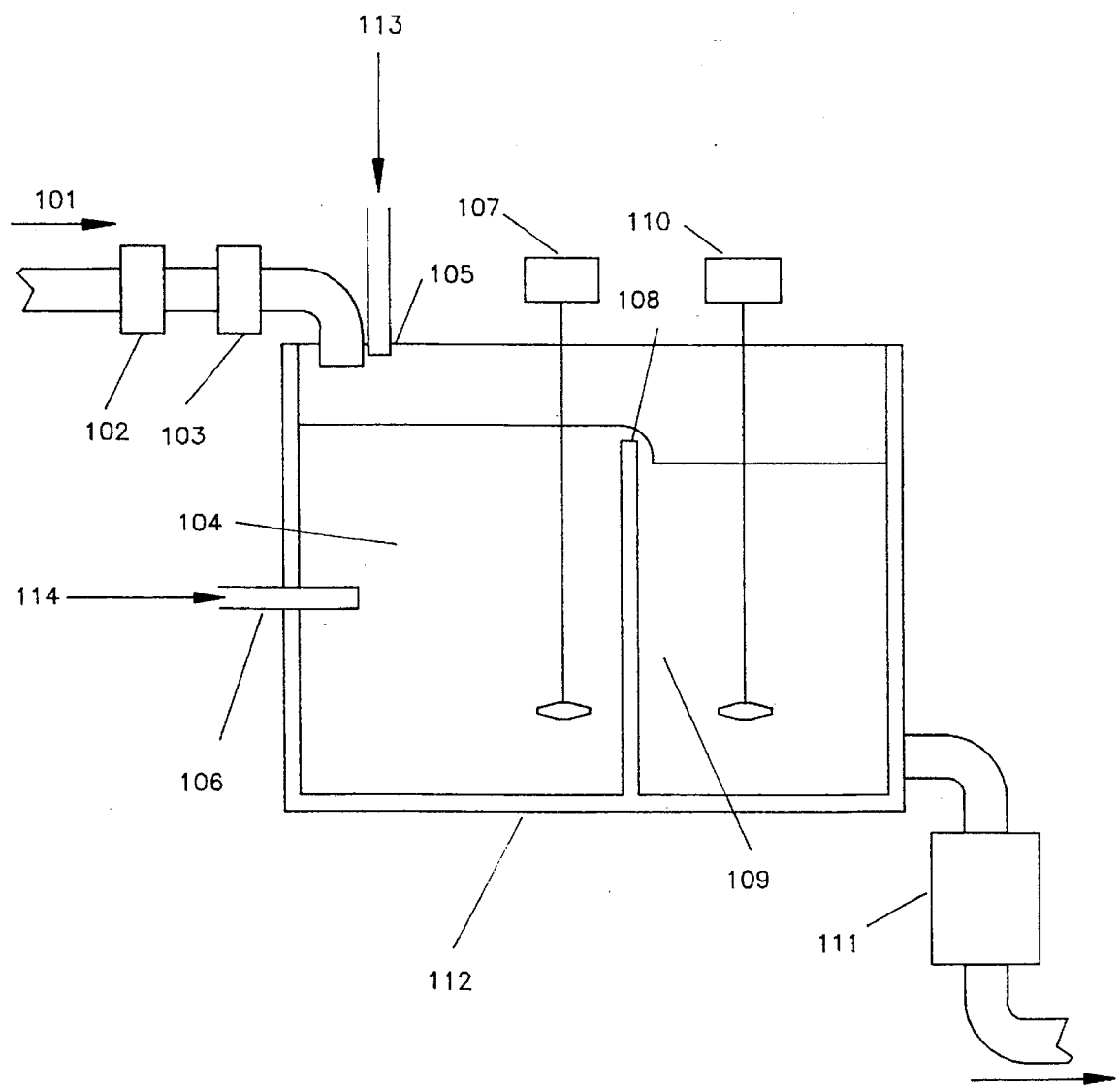
FIG. 1 is a side view of inlet piping, and a cross section of a mixing chamber and retention-discharge tank for use in an embodiment of the method of the invention.

This invention describes a process for the pre-treatment of effluents from food processing plants. The purpose of the pre-treatment is primarily to reduce the level of proteinaceous material but also reduces the suspended solids and oil and grease. These three major components are combined in a mixed floc which is then separated from the liquid component of the stream by a conical designed settling chamber array.

Food processing plants can be defined as those in which the animal-bird-fish-shellfish enters whole and are then processed completely or are only partially processed. Alternatively the plant may process a partially processed animal-fish-shellfish from other plants. In this respect it is obvious that the effluent stream from the plants will have different composition and also that the streams from each unit operation with each plant will have a markedly different composition.

Effluent streams from the whole plant or the individual streams from the unit operation in the plant can be treated. The dosage required for treatment will depend on the strength of the combined individual stream. The strength of the effluent can be defined in terms of its contents of protein, suspended solids, oil and grease, BOD or COD. As one embodiment of this invention relates to the removal and recycling of the protein component of the waste streams, it is preferable to use the protein content of these streams as a measure of its strength.

A correlation between the dose of coagulant-flocculant needed and the protein content of the effluent can be established for each effluent and this serves as a close approximation to estimate the effective dose to use. The presence of the other components, especially solids, will require that larger amounts of the treatment agents be required.

In the treatment of the effluent, it may be of value to treat individual (unit) streams wherever applicable. A unit stream can be defined as one originating on the killing floor or a secondary processing area, e.g. evisceration or canning, scalding or defeathering or an on-site rendering plant. In this manner, a heavy strength stream, for example that from a reduction plant at a fish processing plant, can be treated to produce a stream with a much reduced protein, TSS or BOD content. Discharge of this treated effluent would have economic as well as aesthetic qualities.

In the following discussions, combined or unit stream are referred to generally as "effluent streams". Food processing plants include but are not restricted to those operations which partially or completely processed beef, hogs, chickens, turkeys, shellfish, seafoods or fresh water fish.

The effluent stream is primarily acidified to a pH of preferably below 4.50 and above 3.00. Preferably a pH of between 3.5 to 4.50 is optimum for protein precipitation and floc settleability.

Acidification can be accomplished by addition of a mineral acid such as sulphuric, nitric or hydrochloric acid to a mixing-equilibration tank containing the effluent or can be added in-line to the conduit carrying the effluent from the plant. Preferably sulphuric acid is used as it has minimum effects on the biological load of the effluent (as would nitric acid) or on material being used in the treatment process (hydrochloric acid on stainless steel) or the residual chloride level of the effluent (as would hydrochloric acid).

The pH is adjusted and maintained at the described value via a closed loop pH control system employing a pH probe attached to a meter which controls the addition of the acid.

An inorganic coagulant is contacted with the acidified effluent by adding it to the effluent in the mixing tank or in-line with the acid. It is preferable to add the coagulant to an acidified effluent but it can also be added at the same time as the acid. In either case rapid mixing is required to ensure interaction of precipitated proteins-solids with the coagulant. In the preferred embodiment of this invention, the coagulant is a smectite clay of the montmomorillonite class. Preferably, crude bentonite clay and fuller earth are used but derivatives such as acid activated or alkali activated bentonite can also be used. The coagulant is added at concentrations of 20–100 ppm of the effluent. The amount added is dependent on the protein content-suspended solid strength of the effluent. As known to those experienced in the art, the amount of coagulant to be added can be determined by standard "jar" tests.

In the present case, the efficiency of coagulation is determined by the removal of protein from the effluent stream.

To aid in the separation of the flocs from the liquid flocculating agents are added. The nature of the flocculating agent is such that it is acceptable in the animal feed-food industry and that it is potentially biodegradable, has a high molecular weight and is preferably negatively charged. The purpose of the flocculating agent is to complete the charge neutralization of the suspended particles and possibly increase the number of interparticle interactions by bridging action. Biodegradable polymers that can be used include alginic acid, k-carrageenan, $\lambda$-carrageenan and $\iota$-carrageenan. Alternatively crude preparations of these polymers can be used in the form of powders from crude algal preparations. The algae would belong primarily to the class of Rhodophyceae or Chlorophyceae. Alternatively acid extracts of the crude algal powders-flours can be used. These are prepared by heating the powders in a 6–8% solution) with 0.1N–0.5N H $H_2SO_4$ at 25°–40° C. for 1–2 hours and removal of the insoluble residue by centrifugation. The liquid extract is added to the acidified coagulant treated wastewater or can be used as a suspending medium for the bentonite coagulant. In the latter case, the coagulant and flocculant would be simultaneously added to the acidified wastewater with no adverse effect on protein removal or floc settleability. Similarly, the crude algal powders can be added with the coagulant and resuspended in 0.1N–0.5N $H_2SO_4$ prior to addition to the acidified wastewater. It is contemplated that the presence of acid will assist in improving the longterm storage of these biologically susceptible materials.

The inorganic coagulant is present in an amount by weight of at least 1.5 times the amount by weight of polymeric flocculant, and preferably more than 2.5 times, for example 5 times, and less than 7 times.

It is believed that other biological derived polymers can serve as flocculants. These would include, but not be restricted to, plant polysaccharides such as gum arabic, pectic acids, other algal polysaccharides such as furcellaran or microbially derived polymers such as polyhydroxybutyrate, xanthan gum or polyalkanonic acids.

In application, the flocculant is added to water or sulphuric acid to give a 4–6% suspension and added to the acidified coagulant treated effluent to a final concentration of 10–40 ppm of the effluent. In the case of Irish Moss as the flocculant, a preferred amount of between 10 and 20 g of flocculant will be added to 1000 l of effluent, with 50–100 g of bentonite clay. Amounts of combined coagulant and flocculant less than 70 g per 1000 l are believed to give surprisingly good results, particularly when combined with the use of the apparatus of the invention. The amount of flocculant added will, as in the case of the coagulant, depend somewhat on the strength of the effluent amount of protein removed and the settleability of the floc. As an example of the latter, kappa and lambda carrageenans are both effective flocculating agents in that they produce a floc that is easily settleable. However, lambda carrageenan is more effective in the removal of protein from effluent streams and this provides a more efficient system for recovery of this component from the effluent stream.

The settleability and hence separation of the floc can be further improved if a coflocculant is added. In this application, to the acidified coagulant and flocculant treated effluent is added a biological polymer such as chitosan or NaOH treated shellfish shells or fish scales. Chitosan is added at a final concentration of 2–10 ppm. The floc produced settles rapidly. In this application, the pH does not need to be adjusted to effect the efficient removal of protein or enhanced floc settleablitiy.

After treatment of some effluents, e.g. those from poultry or red meat processing plants, the liquid remaining after separation of the flocculated material still remains cloudy or opalescent. The clarity can be improved by adding insoluble salts of the alkali earth metals. Preferably $CaCO_3$ is added at a final concentration of 5–20 ppm of calcium. Toxic material such as a toxic amount of metal salts such as iron or aluminum sulphate should not be used.

The flocculated material can be separated from the liquid phase by conventional methods such as centrifugation, filtration (filter press), dissolved air flotation or settling chambers. It is preferable to use a settling chamber array. The operating volume of the chamber is such that it has accommodated a variety of flow rates (0–166,000 L-h), solids contents of effluent (3–30%), residence times (30–60 min) and can be run for a limited time in continuous mode of operation. The combined technology is applicable to various strengths of effluents from red meat, hog, poultry, turkey or fish processing plants.

The resultant sludge can be alternatively dewatered by conventional methods e.g. filter press, centrifugation or added directly to substances used for animal feed preparation. In the latter case, the sludge would be dewatered by evaporation. In this manner the sludge can be used to increase the protein content of the animal feed.

Apparatus for use in applying the method of the invention to the discharge from a food processing operation is shown in FIGS. 1, 2, 3, 4 and 5. It will be appreciated that while the coagulant and flocculant are both believed necessary in the method of the invention, for the treatment of a continuous effluent stream of the size often found emanating from food processing plants, fairly rapid settling of the flocs is required. The apparatus of the invention is intended to enhance efficient settling of the flocs.

The structure of a mixing and retention discharge tank is shown in FIG. 1 where effluent moving the direction 101 from a food processing plant (not shown) flows through flowmeter 102, pH meter 103 and into mixing portion 104 of tank 112. Acid 113 is added at the point 105 to render the effluent acidic, and the inorganic coagulant and biologically derived polymeric flocculant are added at the point 106. Mixing is accomplished with a slow speed mixer 107. The fluid then flows over weir 108 and into retention-discharge half 109 of the tank 112 where a second slow speed mixer 110 keeps the flocs that are forming in the effluent and the chemicals in suspension. The fluid is then pumped out of the retension-discharge tank 112 to the settling system (FIGS. 2, 3 and 5) by pump 111.

Figures 2, 4:
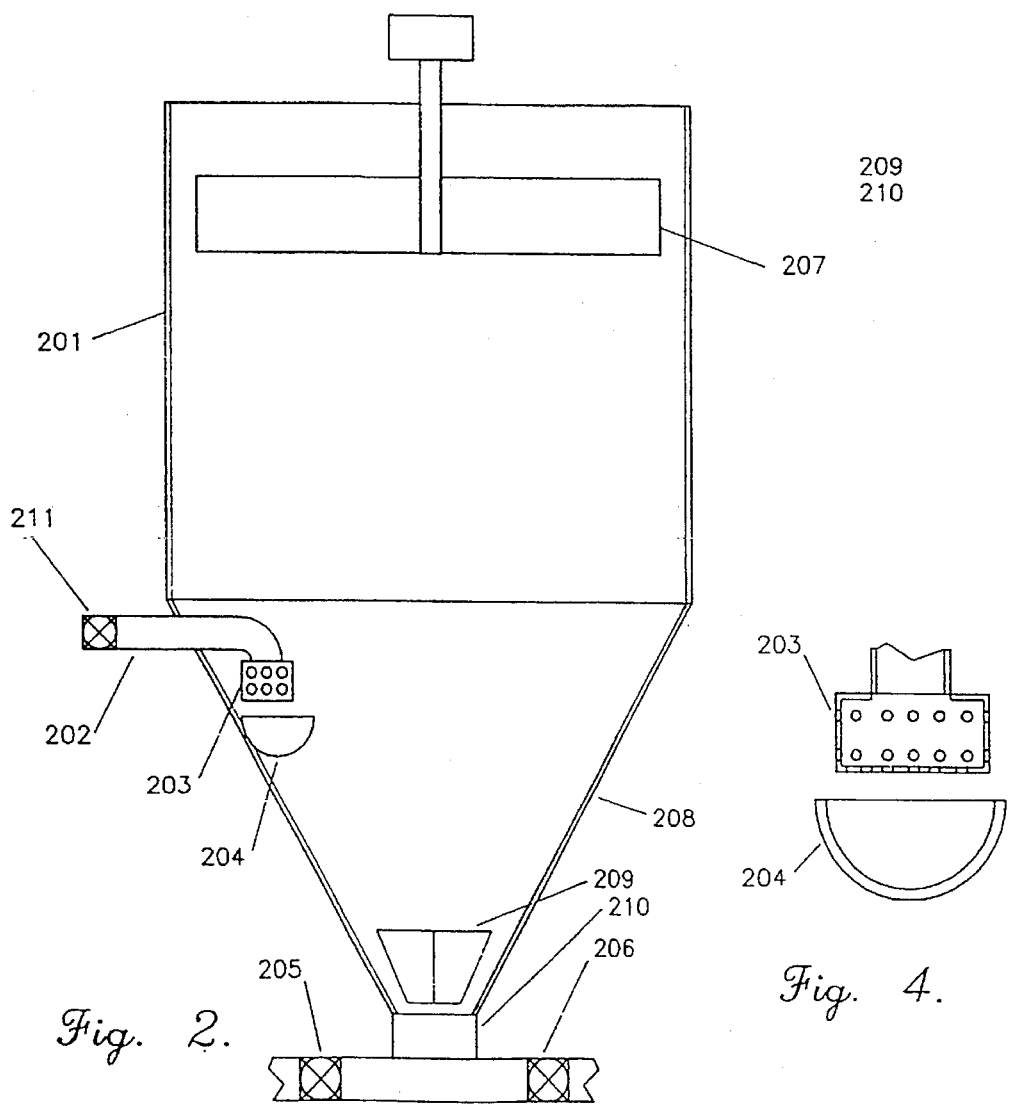
FIG. 2 is a circular cross section of a settling vessel for use in an embodiment of the method of the invention.
FIG. 4 is a detail view of the diffuser and seed retention bowl of FIG. 2.

The structure of the settling vessel is as shown in FIG. 2. The vessel 201 has an inlet valve 211. an inlet 202 and a diffuser 203 stationed above a seed retention bowl 204. The vessel also features a cone shaped lower end 208 and a vortex breaker 209 above oulet 210 to supernatant discharge valve 205 and the sludge discharge valve 206. In the upper end of the vessel is a slow speed paddle 207.

Figure 3:
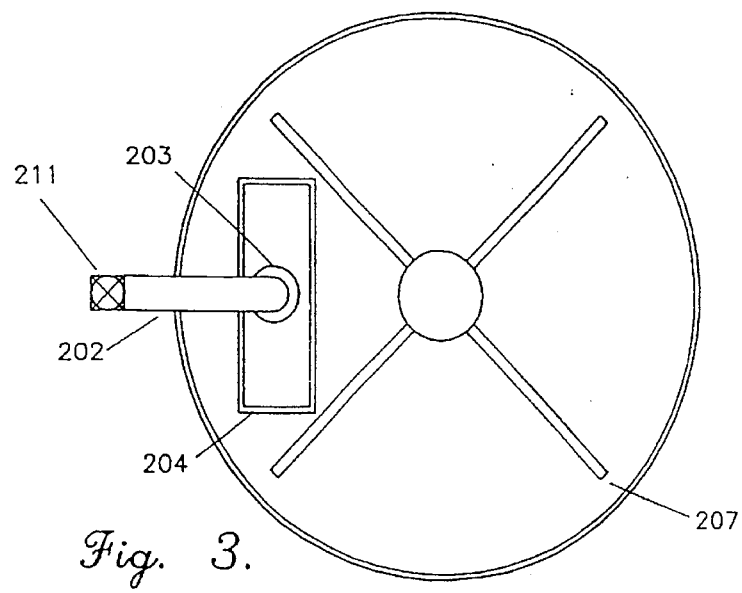
FIG. 3 is a top view of the settling vessel of FIG. 2.

FIG. 3 is a top view of FIG. 2 showing the relative positions of the slow speed paddle 207, the inlet 202, the diffuser 203 and the seed retention bowl 204. FIG. 4 is a sectional view of the diffuser 203 and seed retention bowl 204 from FIG. 2.

Figure 5:
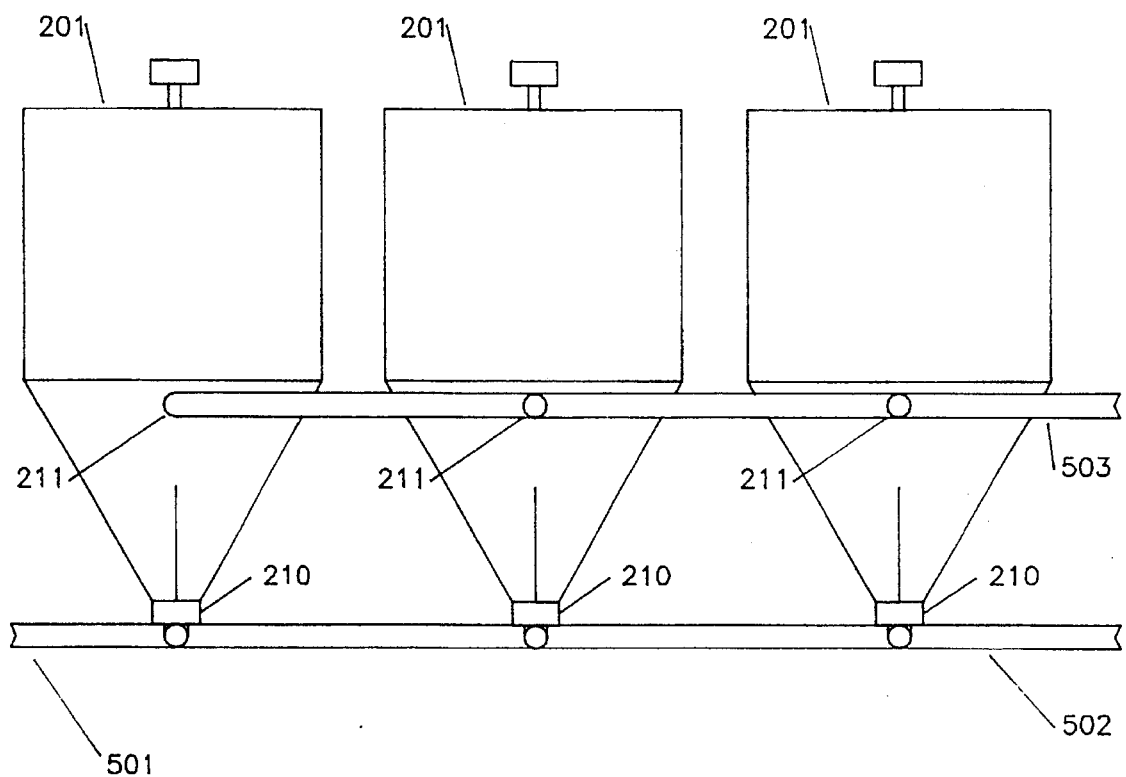
FIG. 5 is a side view of three settling vessels for use in an embodiment of the method of the invention.

FIG. 5 is a side view of a set of three settling vessels showing the supernatant 201, outlet line 501, the sludge outlet line 502 and effluent and chemical inlet line 503 which connects to the settling vessel inlet valves 211.

A preferred method for mixing the coagulating and flocculating chemicals used in the method of the invention is to have the untreated effluent initially contacted by the coagulating and flocculating chemicals in tank 112 where the pH is balanced to the appropriate level for efficient settling. A short retention time is required for the reaction of the coagulant and flocculant of the inventon and then the fluid is allowed to enter the settling-discharge tank 109 from where it is pumped to the settling vessels 201 by a non-shear pump 111, preferably of the diaphram or piston or lobe type. Impeller type (centrifugal) pumps tend to shear the floc and reduce the floccing action of the mixture of effluent and chemicals and are therefore not preferred.

A continuous batch process using three settling vessels is preferred for high volume discharges. In operation, vessel number one is filled with treated effluent and allowed to react and the flocs settle while vessel number two is being filled. When vessel number two is full, filling of vessel number three begins and the flocs in vessel number two are allowed to settle. At the same time as vessel three is filling, vessel number one has the settled materials pumped out and then the clear liguid pumped out and is ready for filling again when vessel number three is full of the treated effluent and ready for the allowed settling time. The cycle is repeated and under ideal conditions of flow rate and vessel sizing, a constant inflow and outflow of the processed effluent is achieved.

The seed retention bowl 204 is used to allow a seed of fully formed flocs to be retained from the previous batch and added to the incoming fluid in each vessel 201 when the vessel is filled with treated effluent from the discharge-settling tank. Use of the seed retention bowl 204 enhances floc formation without having additional pumps, lines and timers. The preferred location of the seed retention bowl 204 is immediately below the effluent inlet 202 into the settling vessel 201 where it intercepts fluid entering the settling vessel 201. Preferred volume of the bowl in relation to the volume of the vessel is 1:1000.

The diffuser 203 on the inlet 202 to the settling vessel 201 is used to lessen the disturbance of the effluent and floccing chemicals when they are being transfered into the settling vessel 201. This greatly speeds up the settling of the flocs. The seed retention bowl 204 is placed to receive at least some of the fluid from the inlet 202 passing through diffuser 203.

The rotating paddle 207 is used to decrease the settling time of the flocs by inducing a small disturbance in the settling vessel 201 after the floc has been forming and settling for a predetermined time. This disturbance appears to make the flocs combine into larger masses and fall at a faster rate. For this operation, the paddles may be run by a very slow speed drive, typically 1 revolution per minute.

While settling rate of the floc seems to be independent of vessel shape, a preferred shape for efficient floc discharge is a cone whose apical angle is about 60°, having an outlet whose diameter in relation to the vessel major diameter is about 1:18 for a 60° cone. Such a design minimizes fluid shear at the outlet. Fluid shear may be further reduced by introducing inhibitors to vortex formation, such as baffles or vortex breaker 209, vertically above the outlet 210.

It is also predicted, on a sound basis, that use of a centrifuge for floc and liquid separation will provide efficient separation.

The following examples are presented to demonstrate the applicability of the invention but should not be construed as limiting the scope of the invention. The protein content and Chemical Oxygen Demand of the untreated and treated effluent were measured using the BioRad protein assay kit and Biosciences Inc. COD tubes respectively. An estimate of the settleability of the flocs was made by measuring the settled volume in a conical tube after 15 minutes. The tests were conducted in a standard jar test assay using 1 L of effluents.

EXAMPLE 1

Total effluent from a hog slaughter house was acidified to a pH of 4.30–4.50 with 10N H2SO4. Bentonite clay was added at a level of 50 ppm with rapid mixing. To the suspension was then added pure preparations of kappa-, lamba- or iota-carrageenan. The results are shown below.

| Insoluable Ca ppm | Carrageenan ppm | Protein mg/L | COD mg/L | Settleability % settled |
|---|---|---|---|---|
| As CaSO4 | | | | |
| Raw Untreated | | 637 | 4371 | 10% |
| 20 | 20(Kappa) | 98 | 1070 | 95% |
| 20 | 20(Lambda) | 14.5 | 1021 | 90% |
| 20 | 20(iota) | 161 | 1229 | 75% |
| As CaCo3 | | | | |
| 20 | 20(kappa) | 158 | 1131 | 95% |

EXAMPLE 2

In a large-scale pilot study on a fish reduction plant, the effluent was acidified to a pH of 3.90–4.00 with sulphuric acid. To the acidific effluent, a mixture of bentonite and crude preparation of *Chondrus crispus* (Irish Moss) (2.5:1 ratio) was added continuously. The flocs were separated from the liquid in the 3 coned settling chamber assay. The effluent was treated for a period of 6 hours and the treated stream was assayed for protein, COD, BOD and TSS

| Trial # | Protein mg/L | COD mg/L | BOD mg/L | TSS mg/L |
|---|---|---|---|---|
| 1. Treated | 0.017 | 1405 | 863 | 85 |
| Raw | 2110 | 11,473 | 5392 | 5838 |
| 2. Treated | 0.096 | 6994 | | |
| Raw | 3300 | 27,159 | | |

EXAMPLE 3

Effluent from a hog processing plant was acidified to a pH 4.30 with sulphuric acid. Bentonite clay was added with rapid mixing to give a final concentration of 50 ppm. To the suspension was then added a flocculant (λ-carrageenan) and a co-flocculant (chitosan) in various combinations.

| Conc$^h$ Flocculant | Conc$^h$ Co-flocculant | Protein removed | COD removed | Settled 15 min. |
|---|---|---|---|---|
| 10 ppm λ-carrageenan | ppm chitosan | 68% | 62% | 85 |
| 10 ppm λ-carrageenan | 5 ppm chitosan | 66% | 65% | 90 |
| 10 ppm λ-carrageenan | 10 ppm chitosan | 71% | 65% | 95 |
| 20 ppm λ-carrageenan | 2 ppm chitosan | 89% | 69% | 90 |
| 20 ppm λ-carrageenan | 5 ppm chitosan | 81% | 67% | 90 |
| 20 ppm λ-carrageenan | 10 ppm chitosan | 76% | 64% | 90 |
| 10 ppm λ-carrageenan | 0 | 68% | 62% | 90 |
| 20 ppm λ-carrageenan | 0 | 84% | 64% | 90 |
| 0 | 0 | 62% | 61% | 85 |

EXAMPLE 4

Effluent streams from various food processing plants were obtained and acidified to a pH of 4.20–4.30 with sulphuric acid. The acidified effluent was then treated with 50 ppm bentonite clay and two concentrations of a crude preparation of *Chondrus crispus* as a flocculant. Protein removal, COD removal and settleability of the floc were then measured.

| Type of Plant | Concentration Flocculant | Protein Contents mg/L | COD mg/L | Settleabil. % after 30 min. |
|---|---|---|---|---|
| Chicken | 20 ppm | 71 | 313 | 80 |
| Untreated Raw | | 296 | 1286 | 10 |
| Sausage | 20 ppm | 6 | 1747 | 90 |
| Untreated Raw | | 698 | 16,605 | 20 |
| Fish Reduction | 20 ppm | 392 | 2605 | 95 |
| Untreated Raw | | 1870 | 5701 | 50 |
| Chicken | 20 ppm | 408 | 1948 | 90 |
| Untreated Raw | | 1330 | 6996 | 20 |

A person skilled in the art could make immaterial modifications to the invention described and claimed in this patent without departing from the essence of the invention.

The embodiments of the invention in which an exclusive property or privilege is claimed are defined as follows:

1. A process for the treatment of an effluent stream from a food processing plant, in which the effluent has an acidic pH and carries proteinaceous material, the method comprising the steps of:

contacting the effluent with an inorganic coagulant clay of the montmorillonite class that together with the acidic pH effectively neutralises ionic charges on the proteinaceous material to cause the proteinaceous material to precipitate out of solution;

contacting the effluent with biologically derived carrageenan to facilitate settling of the precipitated proteinaceous material as flocs;

the inorganic coagulant being present in an amount by weight of between 1.5 and 7 times the amount by weight of carrageenan;

allowing the flocs to settle in a settling vessel;

and removing the flocs from the effluent stream.

2. The process of claim 1 in which the effluent stream is initially not at an acidic pH and further including, before or at the same time as contacting the effluent with the inorganic coagulant, treating the effluent with an acid to maintain the acidity of the effluent stream between 3.5 and 4.5 pH.

3. The process of claim 1 in which the clay and carrageenan combined are present in an amount less than 70 g per 1000 l of effluent.

4. The process of claim 1 wherein the inorganic coagulant is present in an amount by weight of at least 2.5 times the amount by weight of carrageenan.

5. The process of claim 1 wherein the carrageenan is added at levels of 5–100 grams per 1000 liters of effluent in the effluent stream.

6. The process of claim 1 in which the removed flocs are used for animal feed.

7. The process of claim 1 in which the settling vessel is conical and has an outlet, and vortex formation at the outlet is inhibited by a baffle.

8. The process of claim 1 in which the clayey inorganic coagulant is bentonite.

9. The process of claim 8 in which the carrageenan is $\lambda$ carrageenan.

10. The process of claim 1 in which the carrageenan is $\lambda$ carrageenan.

11. The process of claim 2 in which the carrageenan is $\lambda$ carrageenan.

12. The process of claim 11 in which the clayey inorganic coagulant is bentonite.

13. The process of claim 3 in which the carrageenan is $\lambda$ carrageenan.

14. The process of claim 13 in which the clayey inorganic coagulant is bentonite.

15. The process of claim 4 in which the carrageenan is $\lambda$ carrageenan.

* * * * *